Nov. 13, 1951  S. G. BLUMENSAADT  2,574,811
PORTABLE CLIPPING TOOL
Filed Feb. 7, 1948  5 Sheets-Sheet 1
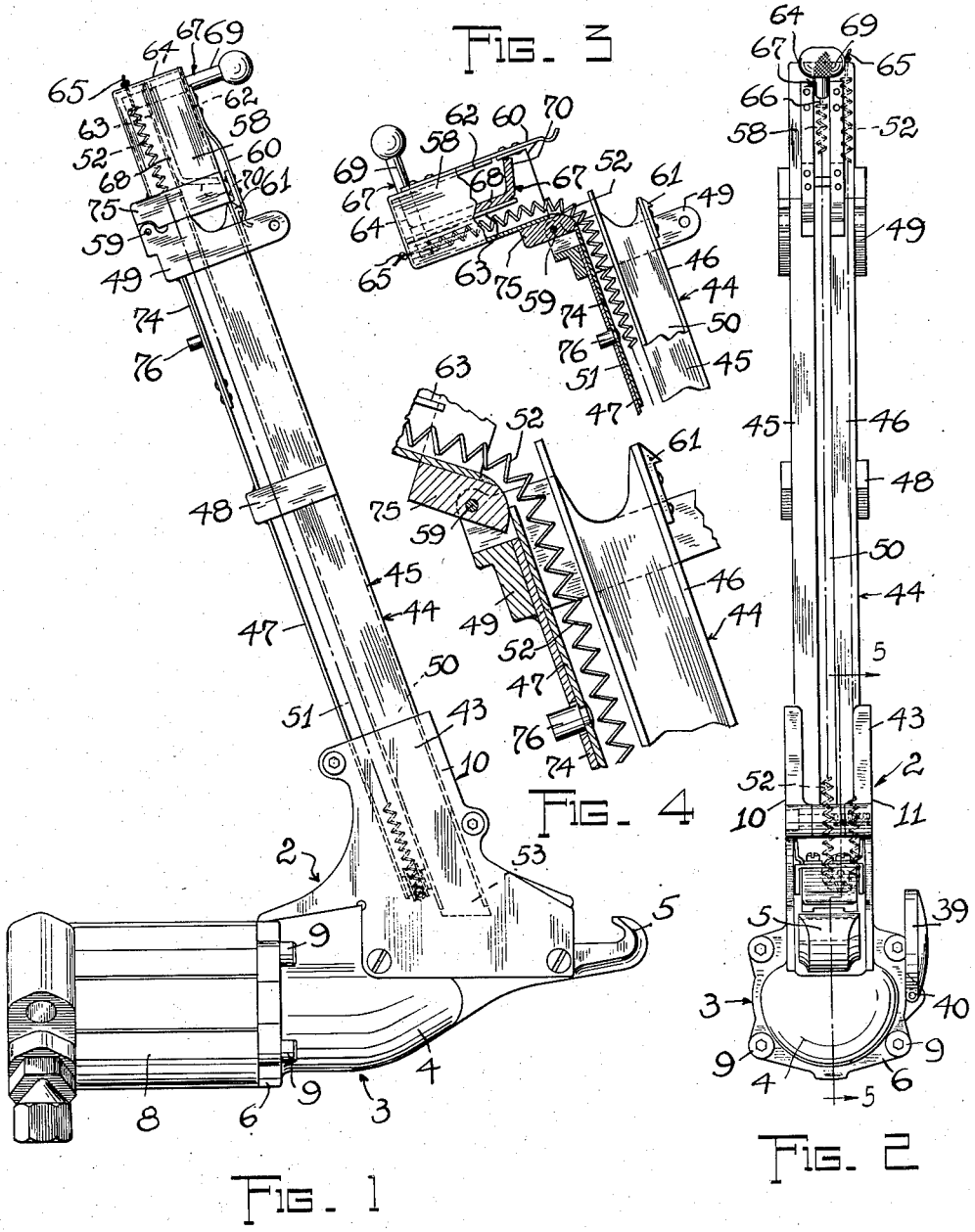
INVENTOR.
SVEND G. BLUMENSAADT
BY
ATT.

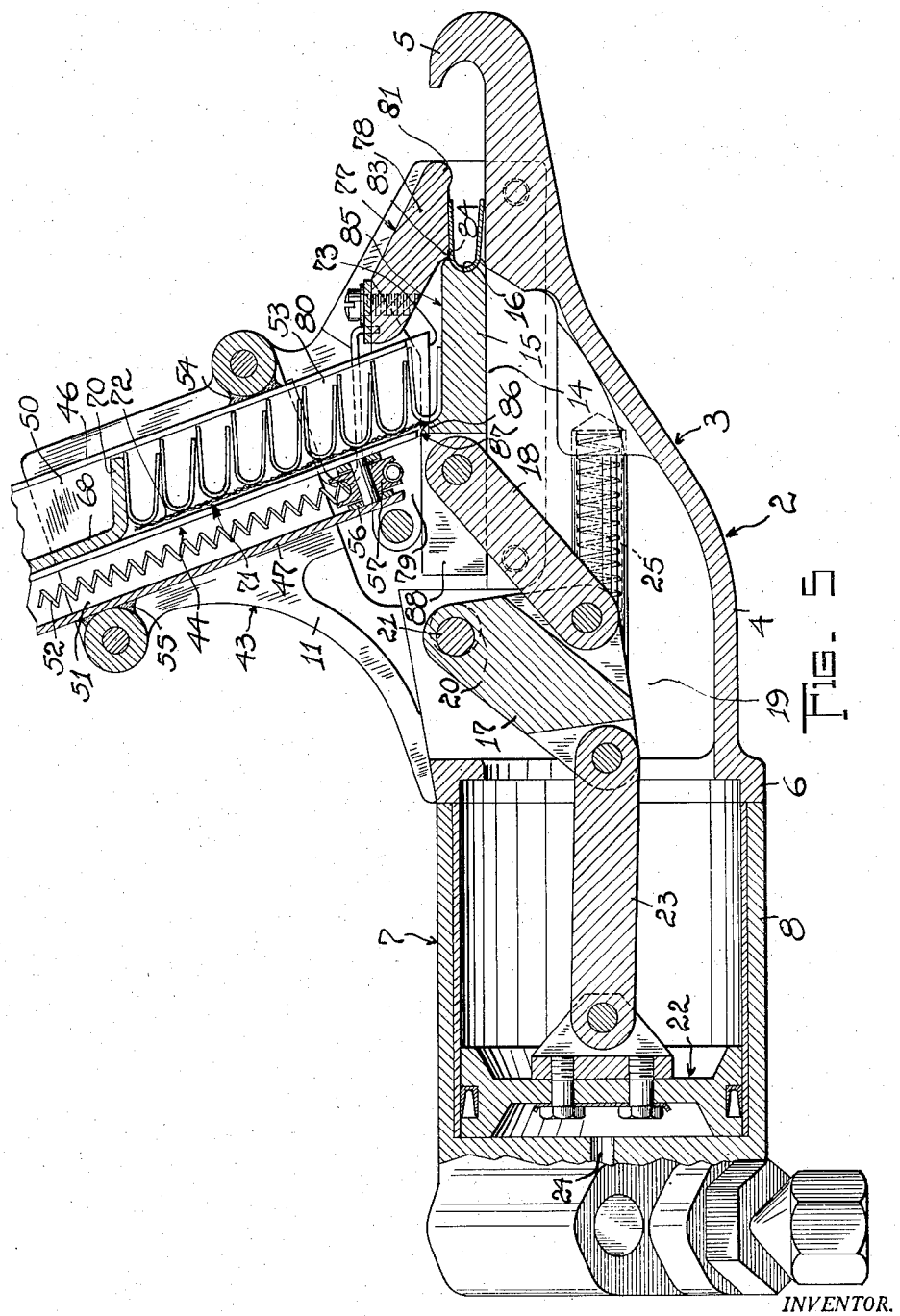

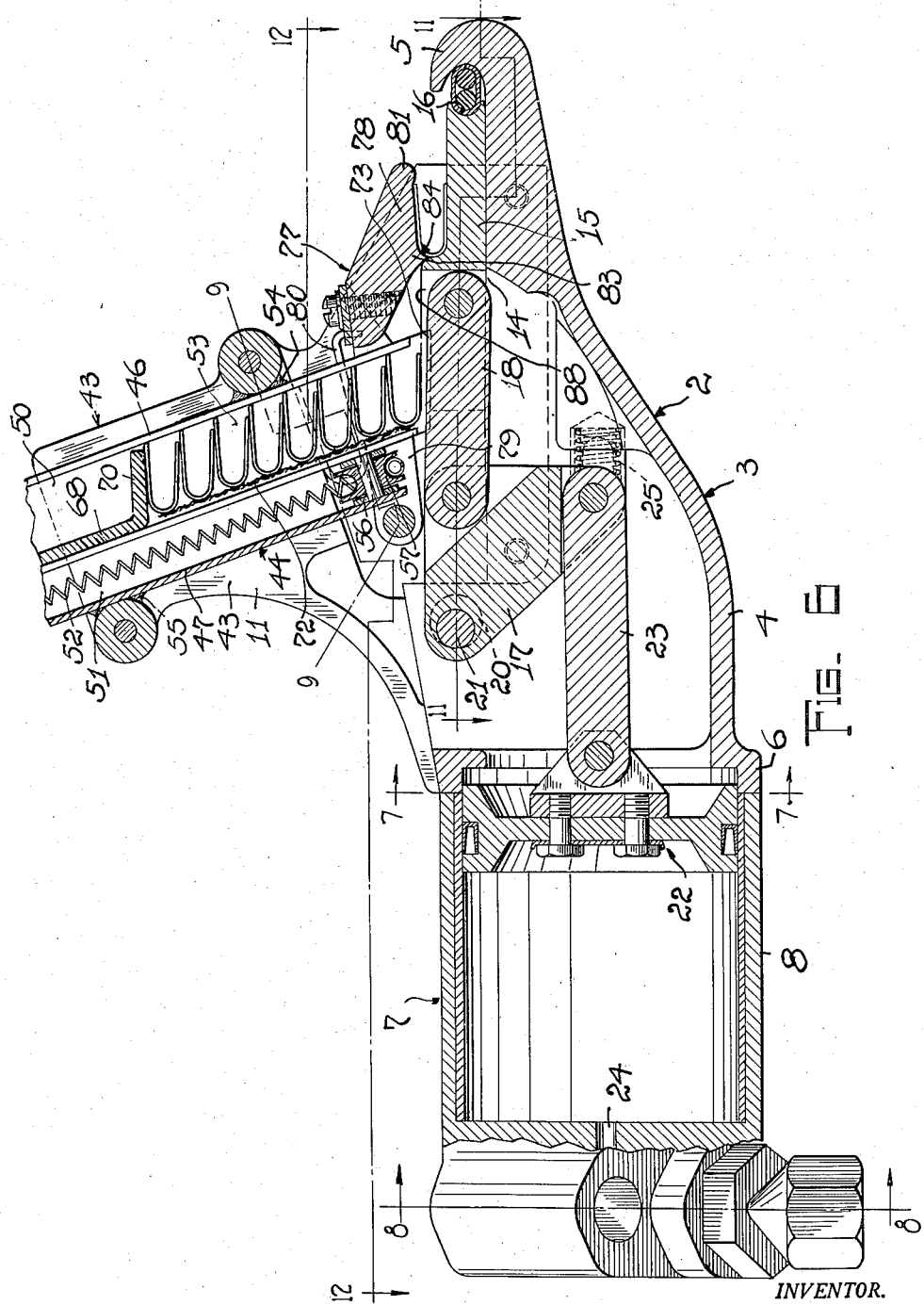

INVENTOR.
SVEND G. BLUMENSAADT
BY
Gustav A. Wolff
ATT.

Nov. 13, 1951     S. G. BLUMENSAADT     2,574,811
PORTABLE CLIPPING TOOL

Filed Feb. 7, 1948     5 Sheets-Sheet 5

INVENTOR.
SVEND G. BLUMENSAADT
BY
ATT.

Patented Nov. 13, 1951

2,574,811

UNITED STATES PATENT OFFICE 2,574,811

PORTABLE CLIPPING TOOL

Svend G. Blumensaadt, Beachwood Village, Ohio, assignor to The Universal Wire Spring Company, Cleveland, Ohio, a corporation of Ohio Application February 7, 1948, Serial No. 6,905

5 Claims. (Cl. 140—55)

This invention relates in general to portable clipping tools for clinching open-ended clips or fasteners and, more particularly, to clipping tools of this type intended for use in clinching clips or fasteners around wire members.

In its broad aspect the invention is primarily concerned with the provision of a simple, efficient, pneumatically-operated clipping tool for clinching open-ended clips or fasteners around springs and wire elements arranged to form supporting spring structures to be used in upholstered seat, back and cushion constructions and has for its principal object the provision of a portable, pneumatically-operated clipping tool constructed with a stationary jaw member and a shiftable jaw member arranged to effect in consecutive steps feeding of open-ended clips from a magazine to an intermediate position, placing such clips about the parts to be clipped and clinching the clips so as to fold same around such parts.

Another object of the invention is the provision of a portable, pneumatically-operated clipping tool constructed with a stationary jaw member, a shiftable jaw member, and a magazine storing a strip of interconnected, open-ended clips in which tool the stationary and shiftable jaw members are associated to each other and the magazine to successively effect by the shifting movements of the shiftable jaw member separating and feeding of single clips from the strip of clips in the magazine to an intermediate position, placing such clips about the parts to be clipped and clinching the clips so as to fold same around the parts to be connected.

A further object of the invention is the provision of a portable, pneumatically-operated, clipping tool constructed with a slide supporting tool body shaped at its one end to a stationary jaw member, a shiftable jaw member slidably arranged in said tool body and a clip storing magazine adapted to store a strip of interconnected, open-ended clips, in which tool the shiftable jaw member, the magazine and the tool body cooperate in effecting by reciprocatory movements of the shiftable jaw member successively separating and feeding of single clips from the strip of clips stored in the magazine to an intermediate position, placing such clips about the parts to be clipped and clinching the thus placed clips by folding same around the parts to be connected.

The above and additional objects and novel features of construction, combinations and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a side view of a portable clipping tool constructed in accordance with the invention.

Fig. 2 is a front view of the portable clipping tool shown in Fig. 1.

Fig. 3 is a fragmentary side view, partly in section, showing the upper portion of the magazine of the tool in opened up position, and Fig. 4 is an enlarged fragmentary sectional view of the upper portion of the magazine of the tool prior to locking the upper portion in fully opened-up position.

Fig. 5 is a sectional view through the portable clipping tool shown in a position ready to place a clip between the jaw members prior to clinching operations, the section being taken on line 5—5 of Fig. 2.

Fig. 6 is a sectional view similar to Fig. 5, showing the tool in clinching position.

Figure 8:
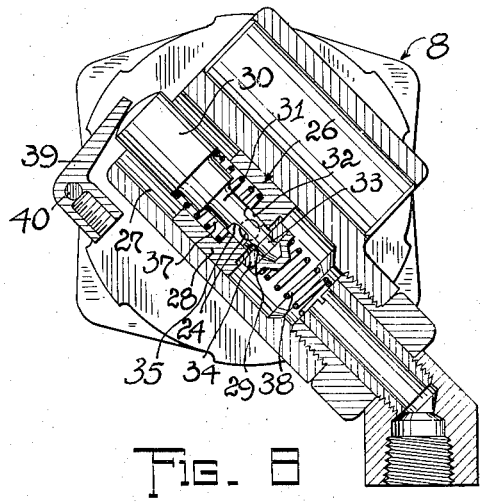
Fig. 8 is a cross sectional view, the section being taken on line 8—8 of Fig. 6.
Figure 7:
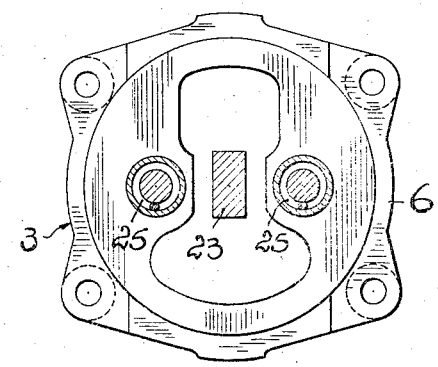
Fig. 7 is a cross sectional view, the section being taken on line 7—7 of Fig. 6.
Figure 10:
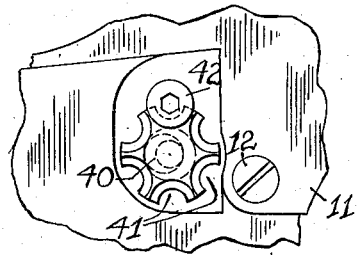
Fig. 10 is a fragmentary side view showing the adjusting arrangement controlling the movement of the shiftable jaw member with respect to the stationary jaw member, the view being taken from line 10—10 shown in Fig. 11.
Figure 9:
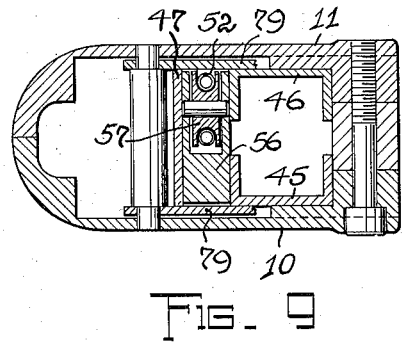
Fig. 9 is a cross sectional view, the section being taken on line 9—9 of Fig. 6.
Figure 11:
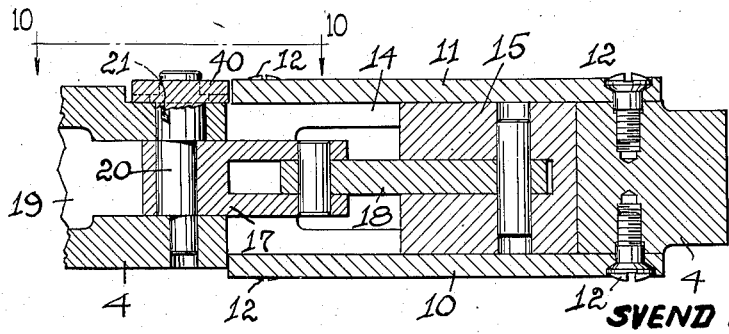
Fig. 11 is a transverse, fragmentary sectional view, the section being taken on line 11—11 of Fig. 6.
Figure 12:
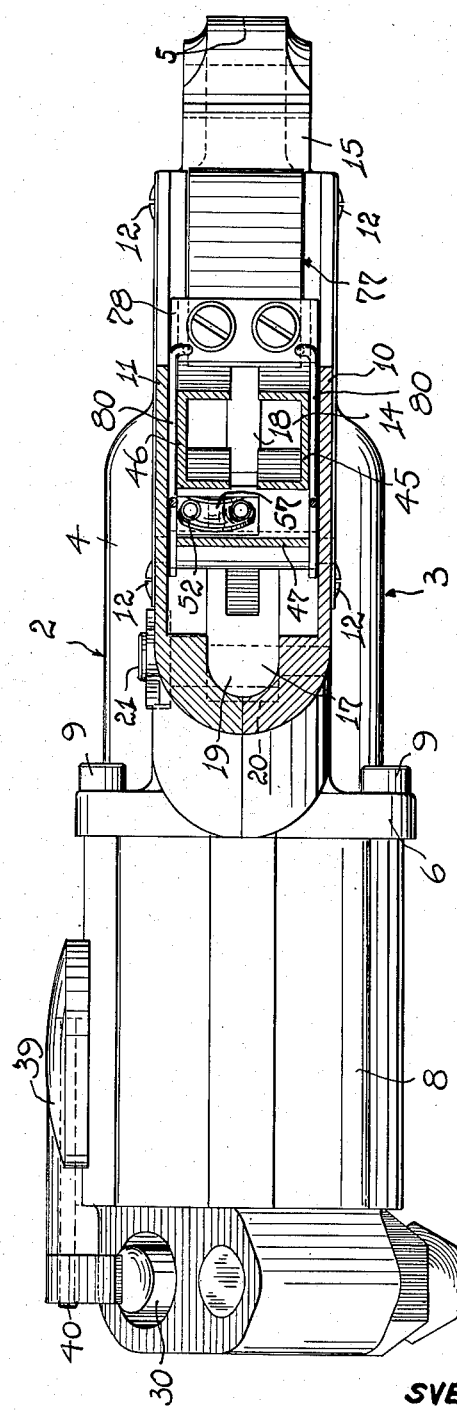
Fig. 12 is a transverse sectional view partly in elevation, the section being taken on line 12—12 of Fig. 6.

Referring now more in detail to the exemplified form of the invention shown in the drawings, reference numeral 2 denotes a portable, pneumatically operated, clipping tool, the elongated chambered housing 3 of which includes a body 4 shaped to a jaw member 5 at its front end and shaped at its rear end to a substantially circumfential flange 6. Body 4 supports with its flange end a pneumatic cylinder 7, the casing 8 of which is attached to flange 6 by headed screws 9. The housing 3 mounts side plates 10 and 11 secured to body 4 by screws 12 and embodies a slide support 14 for a slide member 15. This slide member which forms a shiftable jaw member cooperates with the stationary jaw member 5 in clinching operations on open-ended clips to be clinched about parts to be connected. Slide member 15 has its front edge recessed to a rounded seat 16 to properly engage the rounded backs of clips and has its rear portion linked to a bell crank 17 by a link 18. Bell crank 17 is pivotally mounted in chamber 19 of housing 3 on the eccentric portion 20 of a pin member 21 and is linked to a piston 22 by a link 23. The piston 22 reciprocates in cylinder 7 and is shifted in one direction by valve-controlled, compressed air when entering said cylinder through a bore 24 in casing 8 and in the other direction by the force of compression springs 25 when the flow of compressed air into cylinder 7 is cut off and air present in the cylinder is free to be discharged therefrom into the open atmosphere through bore 24. The feeding of compressed air, from a source of supply not shown, into cylinder 7 and out of said cylinder to the open atmosphere is effected by a valve member 26 arranged in a bore 27 near the end of casing 8. This valve member embodies a valve body 28 with a valve-controlled passage 29 arranged in open communication with bore 24. Passage 29 is controlled by a spring-pressed plunger 30 formed with a reduced part 31 which snugly fits a reduced portion 32 of passage 29. The portion 31 extends through passage 29 and carries at its outer end 33, outside of body 28, a spring-pressed valve 34. The reduced part 31 of plunger 30 is channeled at 35, the channel being sized to align in all positions of plunger 30 with bore 24 and effect either communication of bore 24 with the open atmosphere or communication of the bore 24 with the intake side of the valve member 26, which is held in closed position by compression springs 37 and 38 actuating upon plunger 30 and valve 34. A manually operable lever 39 pivotally mounted on casing 8 by a pin 40 permits shifting of plunger 30 into position to actuate the clipping tool and springs 37 and 38 shift the plunger back to its normal position when lever 39 is released.

The pin member 21, as previously stated, includes an eccentric portion 20 to effect by rotation of pin member 21 lateral and vertical shifting of the pivot axis of bell crank 17 so as to change the stroke of the shiftable jaw member and its relative position with respect to stationary jaw member 5 and permit use of the clipping tool for differently sized clips and parts to be clipped. Pin member 21 is formed with head portion 40' having half circular recesses 41 to permit proper securing of the pin member in its adjusted position by a headed set screw 42.

Side plates 10 and 11 of housing 3 extend upwardly and form said housing with a chambered extension 43 seating a magazine 44. This magazine consists of two oppositely arranged side channels 45 and 46 and a back plate 47 connected to each other in spaced relation by brackets 48 and 49 brazed to said side channels and back plate. The thus constructed magazine embodies a clip storage channel 50 and an elongaed space 51 adjacent to said storage channel, which space has extended thereinto elongated coil spring 52 adapted to effect shifting of clips stored in the storage channel toward the lower end 53 of the magazine as will be later described. The magazine 44 is at its lower end at 54 and 55 welded to the side plates 10 and 11 and mounts in the lower portion of the space 51 in a spring pulley housing 56 a spring pulley 57 engaged by coil spring 52. The upper end of magazine 44 has pivotally attached thereto an end box 58, pivoted to the bracket 41 by pin 59 and held in proper alignment with magazine 44 by a latch spring 60 riveted to end box 58 and cooperating with a latch bar 61 on magazine 44. The thus described end box 58 of the magazine, which end box includes side channels 62 and 63 arranged in alignment with the side channels 45 and 46 when the end box is latched to the magazine, has secured to its top wall 64 the one end 65 of coil spring 52 which spring extends downwardly to and around spring pulley 57 and then upwardly and has its other end 66 attached to a follower member 67 consisting of a follower shoe 68 secured to a knobbed follower rod 69. Follower member 67 rests with the heel portion 10 of its follower shoe 68 upon the top clip of a strip of clips 71 stored in the storage channel 50, the clips being glued to a supporting strip of material 72. Follower member 67 shifts by means of coil spring 52 the strip of clips 71 downwardly toward the lower open end 73 of storage channel 50.

The magazine 44 is loaded by inserting a strip of clips into the storage channel 50 when the end box 58 is in fully-opened position and held in such position by steel spring 74 secured with its one end to back plate 47 and engaged with its other end with a hinge member 75 on end box 58. A knob 76 on spring 74 permits ready release of said spring and shifting of the end box from opened position to closed position by force of the elongated coil spring 52.

A discharge of clips from the lower open end 73 of storage channel 50 is effected by the shiftable slide or jaw member 15 in cooperation with a holding member 77, having a foot portion 78 which has rearwardly extended therefrom narrow arms 79 pivotally connecting the holding member with the side plates 10 and 11. This holding member is yieldingly forced downwardly by springs 80 engaging the foot portion 78, which at its front end includes a bulged nose portion 81 and at the rear end of its bottom portion 82 includes a ridge 83 shaped to form a curved stop shoulder 84. The space between nose portion 81 and ridge 83 is dimensioned and designed to fit the upper portion of a U-shaped open-end clip previously transferred by the shiftable jaw member 15 from the lower open end 73 of magazine 44 to this intermediate station, the ridge 83 forming a curved stop shoulder 84 preventing backward travel of the clip with jaw member 15 when same returns on its back stroke to its initial position.

Reciprocatory movement of the shiftable slide or jaw member 15, which is effected by reciprocatory movements of piston 22 in cylinder 7, transfers on each forward stroke of the shiftable jaw member a clip from the lower open end 73 of magazine 44 to the intermediate station above referred to and shifts a clip from the intermediate station toward the stationary jaw member to effect clinching of such clip around the parts to be connected and then seated in the stationary jaw member. This action of the shiftable jaw member which reciprocates below the lower open end of magazine 44 is made possible by the shape of the top 85 of slide member 15 which forms a seat having at its rear end a cut-off and backing portion 86. Top 85 seats the lowest clip of the strips of clips 71 and when jaw member 15 is shifted forward, cuts with the sharp-edged corner 87 of cut-off and backing portion 86 the strip material 72 to free the lowest clip from strip 71 and thereafter shifts the thus freed clip to the intermediate position by its raised portion 88 engaging the curved rear portion of such clip. Forward shifting on the forward stroke of the shiftable jaw member also effects upward tilting of holding member 77 until the curved stop shoulder 84 of foot position 78 can snap into position between the back of clip and the raised portion 88 of the shiftable jaw member, a position preventing backward travel of the clip with shiftable jaw member 15 when on its back stroke while returning to initial position. In addition to this action of shiftable jaw member 15, the front portion thereof effects at the beginning of the forward stroke upward tilting of the shutter member, engages thereafter with its rounded seat 16 the rounded back portion of a clip resting in the intermediate position, effects shifting of the thus engaged clip toward the stationary jaw member, and finally and in cooperation with such stationary jaw members effects clinching of the clip around the parts to be connected, then resting in said stationary jaw.

The thus described portable clipping tool is arranged to perform a cycle of operations and then come to a stop. As shown the tool is actuated pneumatically by the cylinder piston arrangement attached to the read portion of the body 4 of housing 3. Actuation of valve 26 by lever 39 permits feeding of compressed air into cylinder 7 so that piston 22 is shifted against springs 25, shifts bell crank 17 and therewith jaw member 15 which in turn effects cutting of a clip from the strip of clips in magazine 44 and shifts such clip to an intermediate position while simultaneously shifting a clip held by holding member 77 in an intermediate position toward stationary jaw member 5 to effect clinching of such clip around the parts to be connected. A release of lever 39 cuts off the feed of compressed air into cylinder 4 and establishes its communication with the open atmosphere and permits springs 25 to force piston 22 back to its initial position and therewith effects return of bell crank 17 and shiftable jaw member 15 back to their initial positions for repetition of the cycle just described.

Having thus described my invention, what I claim is:

1. A clip-clinching tool comprising a housing including a stationary jaw member and mounting a clip-storing magazine provided with an open bottom, an elongated shiftable jaw member slidably mounted for cooperation with said stationary jaw member on said housing below said magazine, reciprocatory operating means coupled with said shiftable jaw member and spring pressed clip holding means pivotally supported by said housing to be yieldingly forced between said jaw members when same are in predetermined position, said shiftable jaw member including a clinching end adapted to cooperate in clinching operations with the stationary jaw member and a shouldered top adapted to seat and transfer in clinching operations a clip from the magazine to the clip holding means, said clip holding means including a shouldered bottom portion adapted to hold a transferred clip when the shiftable jaw member, after clinching operations, is shifted toward the magazine, and shift such clip between the jaw members for clinching operations.

2. A clip-clinching tool as described in claim 1 wherein the clip storing magazine carries a strip of clips having adjoining clips secured to each other and wherein the shouldered top of the shiftable jaw member includes a cutting edge adapted to separate the lowermost clip of said strip of clips when the shiftable jaw member in clinching operations is shifted toward the stationary jaw member.

3. A clip-clinching tool comprising a housing with a slide support and a stationary jaw member, a clip storing magazine having an open bottom mounted on said housing above the slide thereof, an elongated shiftable jaw member supported on the slide of said housing below said magazine, reciprocatory operating means coupled with said shiftable jaw member, and a spring-pressed clip holding member pivoted to said housing above said slide and yieldingly forced toward same, said shiftable jaw member including a clinching end portion cooperating in clinching operations with said stationary jaw member and a shouldered top adapted to seat and transfer in clinching operations a clip from said magazine to the clip holding member, said clip holding member including a shouldered bottom adapted to hold a transferred clip when the shiftable jaw member is shifted toward the magazine and the clip holding member is yieldingly forced toward the slide of the housing to position such clip for clinching operations.

4. A clip-clinching tool as described in claim 3 including a lever arrangement coupling said reciprocatory operating means with said shiftable jaw member, said lever arrangement including a bell crank arrangement having a pivot member eccentrically rotatably mounted in said housing to permit adjusting of the movement of the shiftable jaw member with respect to the stationary jaw member.

5. In a clip clinching tool embodying a housing mounting a clip storing magazine and a stationary clinching jaw member, a single, elongated, shiftable feeding and clinching member, shifting means for said feeding and clinching member, and pivotally supported clip holding means adapted to shiftably extend between said members, said shiftable member including a clinching jaw portion effecting clinching of a clip and a shoulder portion adapted to feed another clip from the magazine to the clip holding means when such shiftable member is moved toward the stationary jaw, said clip holding means including a shouldered bottom portion adapted to hold a clip thus transferred to the clip holding means and shift same into position for clinching operations when the shiftable member moves away from said stationary jaw.

SVEND G. BLUMENSAADT.

REFERENCES CITED

The following references are of record in the file of this patent:

UNITED STATES PATENTS

| Number | Name | Date |
| --- | --- | --- |
| 598,132 | Addicks | Feb. 1, 1898 |
| 1,451,717 | Sommer | Apr. 17, 1923 |
| 1,871,321 | Hayford | Aug. 9, 1932 |
| 2,055,257 | Maynard | Sept. 22, 1936 |
| 2,145,461 | Smith | Jan. 31, 1939 |
| 2,145,714 | Davis | Jan. 31, 1939 |
| 2,183,978 | Sorenson | Dec. 19, 1939 |
| 2,205,690 | Green | June 25, 1940 |
| 2,208,058 | Smith | July 16, 1940 |
| 2,329,385 | Bratz | Sept. 14, 1945 |